July 26, 1932.  J. C. DECKER ET AL  1,869,304
METHOD OF MAKING HOSIERY AND PRODUCT THEREOF
Filed March 10, 1932  7 Sheets-Sheet 1
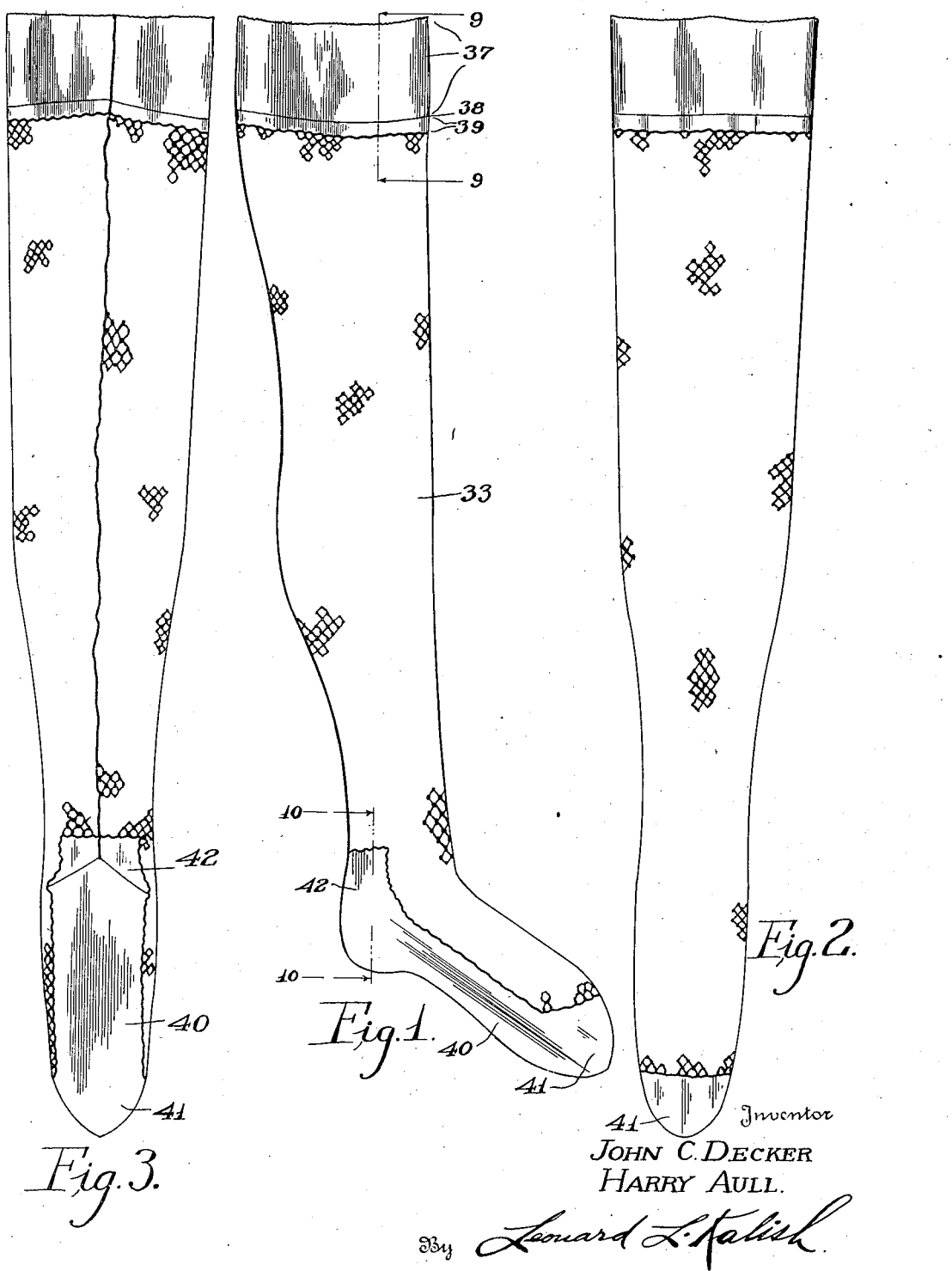

July 26, 1932. J. C. DECKER ET AL 1,869,304
METHOD OF MAKING HOSIERY AND PRODUCT THEREOF
Filed March 10, 1932 7 Sheets-Sheet 2
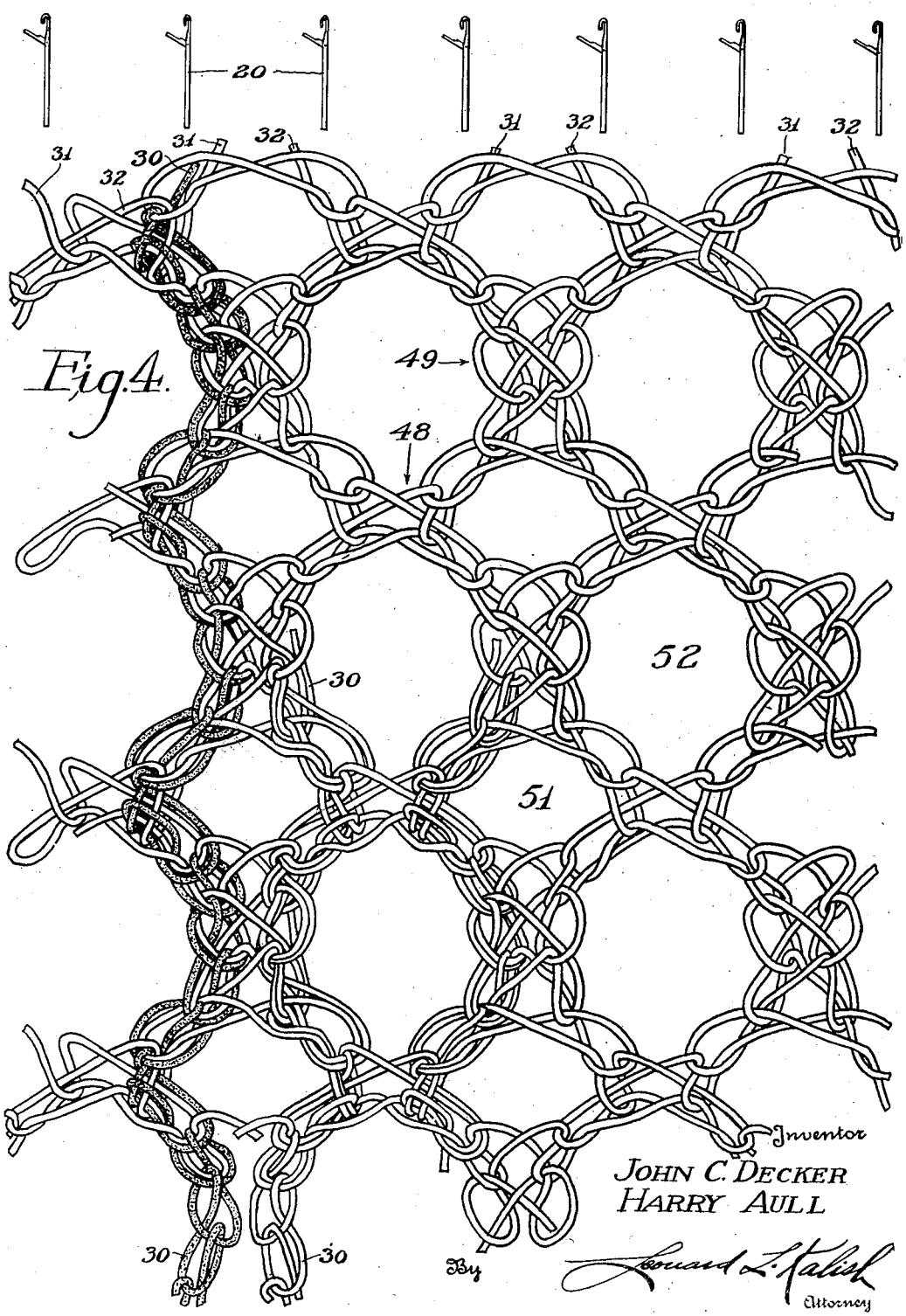
Inventor
JOHN C. DECKER
HARRY AULL July 26, 1932. J. C. DECKER ET AL 1,869,304
METHOD OF MAKING HOSIERY AND PRODUCT THEREOF
Filed March 10, 1932   7 Sheets-Sheet 3

Inventor
JOHN C. DECKER
HARRY AULL
By Leonard L. Kalish
Attorney

July 26, 1932. J. C. DECKER ET AL 1,869,304
METHOD OF MAKING HOSIERY AND PRODUCT THEREOF
Filed March 10, 1932 7 Sheets-Sheet 4

Inventor
JOHN C. DECKER
HARRY AULL.

By Leonard L. Kalish
Attorney

July 26, 1932. J. C. DECKER ET AL 1,869,304
METHOD OF MAKING HOSIERY AND PRODUCT THEREOF
Filed March 10, 1932    7 Sheets-Sheet 5

Inventor
JOHN C. DECKER
HARRY AULL.
By Leonard L. Kalish
Attorney

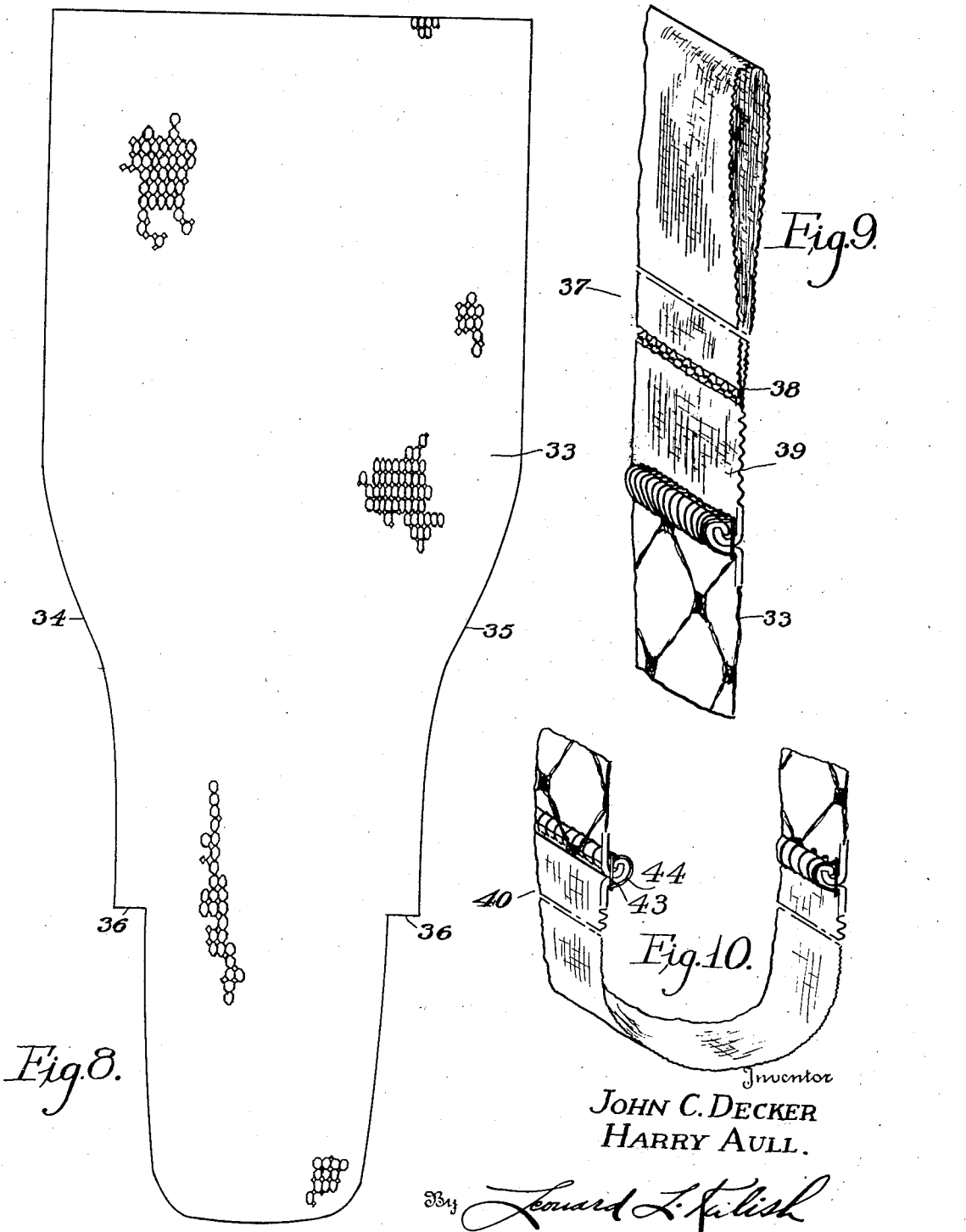

July 26, 1932. J. C. DECKER ET AL 1,869,304
METHOD OF MAKING HOSIERY AND PRODUCT THEREOF
Filed March 10, 1932 7 Sheets-Sheet 7

Inventor
JOHN C. DECKER
HARRY AULL.
By Leonard L. Kalish
Attorney

Patented July 26, 1932

1,869,304

UNITED STATES PATENT OFFICE

JOHN C. DECKER, OF ABINGTON, AND HARRY AULL, OF PHILADELPHIA, PENNSYLVANIA, ASSIGNORS TO FRIEDBERGER-AARON MANUFACTURING COMPANY, OF PHILADELPHIA, PENNSYLVANIA, A CORPORATION OF PENNSYLVANIA

METHOD OF MAKING HOSIERY AND PRODUCT THEREOF

Application filed March 10, 1932. Serial No. 598,010.

Our invention relates to a new and useful method of making hosiery and the product thereof, and it relates more particularly to a method of making hosiery whereby a more durable, and more elastic hosiery may be produced, and whereby certain other novel and highly desirable structural characteristics may be imparted to the finished product, and whereby the cost of production may be minimized.

One of the objects of our invention is to produce hosiery, particularly ladies' hosiery, which will have a net-like open-mesh body of a highly elastic and distensible, and yet of a form-retaining character, so that it will resume its shape, and more particularly, so that the openings in said open mesh will always tend to resume their originally desired shape, no matter how the hose may be temporarily distended, or stretched in any direction.

A further object of our invention is to provide hosiery of this character which will be non-ravelling and "run" proof.

A further object of our invention is to construct the hose in such a manner as to minimize the cost of production, without sacrificing any of the other advantages, such as durability and wear.

Various efforts have been made to produce open-mesh type of hosiery, particularly by employing a type of cloth generally known as "glove-silk", wherein successive rows of holes are created in the cloth to bring about an open-mesh formation. These prior efforts at producing an open-mesh formation by providing holes in common "glove-silk" type cloth, however, have resulted in a structure which still contains substantial areas of closely knit cloth, surrounding the holes, so that the effect is more that of a closely knit cloth with rows of holes created in it, rather than that of a true net-like formation. Thus, these prior efforts at producing an open-mesh hosiery out of a closely-knitted or "glove-silk" type cloth, have resulted in hosiery which contains considerable aggregate area of closely knit cloth as compared to the areas of the holes, and lacks a certain elasticity and capability of being distended in all directions, coupled with the capacity for substantially recovering its original shape after the temporary distension or distortion is eliminated.

It is one of the objects of our invention to produce hosiery having a loosely knit net-like open-mesh body, which will consist of and will present primarily nothing more than loosely knitted lines defining any desired pattern and having merely the minimum area depending on the thickness of yarn used, so that the open-mesh pattern of the hose may be entirely devoid of any flat web areas such as is commonly incident to open-mesh hosiery formed of "glove-silk", and so that the maximum amount of elasticity and capacity for distension may thereby be provided, coupled with a corresponding capacity of the hosiery for recovering its desired shape after the distortion is eliminated.

With the above and other objects in view, which latter will appear more fully from the following detailed description, one of the phases of our invention consists in the novel manner in which the open-mesh net-like fabric of the main body or leg portion of the hose or stocking is formed, as will appear more fully from the following detailed description.

Another phase of our invention consists of the manner in which the hose is built up of its component elements, as will also appear more fully from the following detailed description.

For the purpose of illustrating our invention, we have shown in the accompanying drawings forms thereof which are at present preferred by us, since the same have been found in practice to give satisfactory and reliable results, although it is to be understood that the various instrumentalities of which our invention consists can be variously arranged and organized and that our invention is not limited to the precise arrangement and organization of these instrumentalities as herein shown and described.

Referring to the drawings in which like reference characters indicate like parts, Figure 1 represents a side elevational view of a completed hose embodying our invention, shown on a much reduced scale;

Figure 2 represents a front elevational view of the same, on a similarly reduced scale;

Figure 3 represents a rear elevational view of the same, on a similarly reduced scale;

Figure 4 represents a somewhat diagrammatic plan view, on a much enlarged scale (enlarged about 6¼ times) of a framentary portion of one embodiment of the net-like open-mesh body or leg portion of the hosiery embodying our invention;

Figure 8 represents a plan view of the body or leg section of the hosiery shown in the preliminary flat condition;

Figure 9 represents a section on line 9—9 of Figure 1; on a somewhat enlarged scale;

Figure 10 represents a section on line 10—10 of Figure 1, on a similarly enlarged scale;

Figure 5:
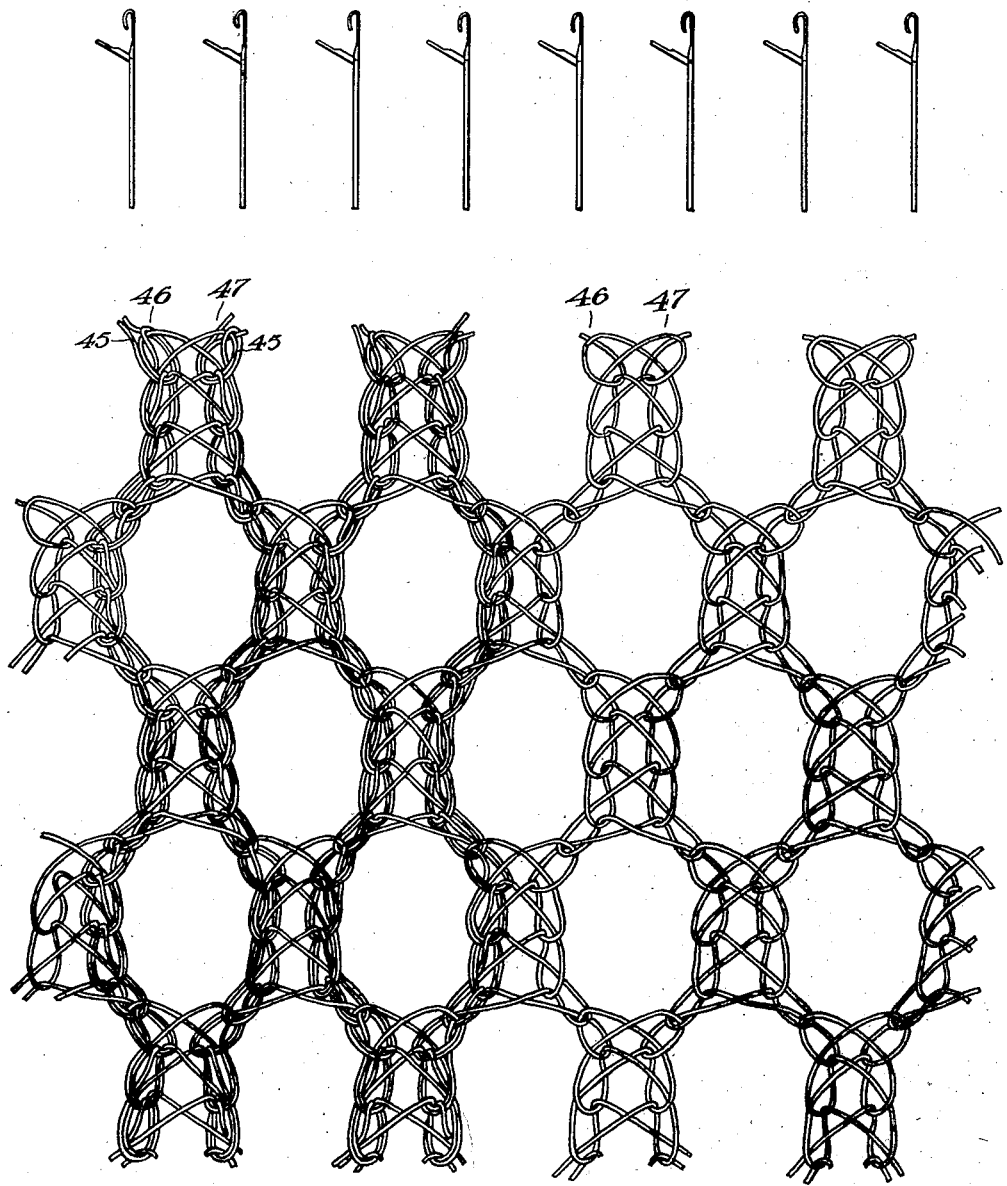
Figure 5 represents a plan view of a fragmentary portion of another or modified form of body or leg section of hosiery embodying our invention.

In carrying out our invention we may utilize a single row or bank of latch needles 20, carried in a single needle bar 21, which in turn is carried and reciprocated vertically, at timed intervals, by a plurality of vertical slides or lift bars 22; the upper ends of the needles 20 being disposed alternately above and below the upper edge of the stationary face plate 23, as the needle bar moves up and down. In the formation of the leg section illustrated in detail in Figure 4, three thread guide bars 24, 25 and 26 are utilized, for carrying corresponding sets or series of threads over the single row of needles 20;—said bars 24, 25 and 26 in turn carrying corresponding rows or banks of thread guides 27, 28 and 29 respectively.

The body or leg portion of the hose of our invention is formed initially in a continuous manner by simultaneously forming two generally longitudinal sets of chain loops, from two different threads, carried by two different bars;—one of the sets of chain loops formed with each stroke of the machine on each needle being separate from each other, that is, not inter-knit with each other, while the other set of chain loops formed with each stroke of the machine on each needle being alternately inter-knit with the two similar adjacent rows on either side thereof at suitable intervals and in a staggered order. The threads which are formed into the non-inter-knit rows of chain loops are designated by the numeral 30, while the threads which are formed into the intermittently inter-knit rows of chain loops are designated by the numerals 31 and 32, respectively. Thus, with each stroke of the needle bar, each needle draws down two threads into contiguous loop formation;—one of these threads always being thread 30 which forms the non-inter-knit chain loops, and the other thread being one or the other of the two similar sets of inter-knit threads 31 and 32. The inter-knit threads 31 and 32 lap over from one needle to the adjacent needle on successive strokes of the needle bar, at suitable intervals and in a staggered relation with respect to the adjacent needles on either side, thereby producing a loosely looped, net-like open-mesh fabric structure for the leg or body of the hose, having a high degree of elasticity and capacity for distention, and being also capable of recovering its original shape after each temporary distortion.

In Figure 4 we have illustrated a much enlarged view of one embodiment of the knit structure of the body or leg section of the hose embodying our invention, and have illustrated the construction of this embodiment in its relation to the row of needles from which this knit structure is derived.

The upper right hand portion of Figure 4 illustrates the fabric structure minus the non-inter-knit lines of chain stitches, while the lower left hand portion of Figure 4 illustrates the completed fabric including the lines of non-inter-knit chain stitches as they issue from each needle. For purposes of illustration each thread is shown in this figure, even though in an actual view of the fabric some of these threads are concealed behind other threads. Thus, the net-work of loosely knit chain stitches occupies somewhat more area in the drawings in relation to the openings or clearings than what the threads actually occupy in the product of our invention, because in the drawings each and every thread is placed in a visible relation to every other thread, and the thickness of the threads is somewhat exaggerated for the sake of simplicity in illustration. It will also be observed, that owing to the loosely knit chain stitch formation, and the loose inter-knitting of adjacent chains of loops, a large amount of distortion is made possible in any direction, without permanently distorting the fabric, that is, without destroying its capacity for recovering its original shape. Thus, a more nearly true elastic quality is obtained. By reason of the general parallelism between the lines of non-inter-knit chains of stitches and the lines of inter-knit stitches, which are inter-knit at intervals, and alternately, with the similar adjacent chains, a thoroughly non-raveling and run-proof structure is also obtained.

The knit structure illustrated in Figure 4 is formed of a width equal, or slightly greater than, the maximum circumference of the hose;—this width being indicated (on a much reduced scale) by the width of the upper portion of the leg blank shown in Figure 8. The knit structure is then cut to suitable lengths and to suitable shape, as indicated in Figure 8; being narrowed down towards the ankle and being further narrowed down towards the instep section.

The leg section 33 is then completed by uniting the opposite longitudinal edges 34 and 35 of the leg blank shown in Figure 8, between the upper edge thereof and the heel off-set 36. This is effected by sewing the said two edges to each other by a line of sewed stitches spaced inwardly a small distance from the free edges and transverse connecting threads extending across the free edges, intermediate of the two sides of each stitch;—the free edges being rolled into a bead to an extent sufficient to gather in a non-raveling loop along the entire length of the united edges.

The top section or welt section 37 of the hose is formed in a manner indicated in sectional view in Figure 9, of a double ply of closely knitted (preferably circular knitted) fabric having its edges inter-knit with each other at 38, and then continuing a suitable distance downwardly in a single ply, as at 39. To the lower free edge of the single ply section 39, the upper edge of the leg section 33 is secured by sewing said two edges to each other by a line of sewn stitches spaced inwardly a small distance from the free edges and transverse connecting threads extending across the free edges intermediate of the two sides of each stitch;—the free edges being rolled into a bead to an extent sufficient to gather in a non-raveling loop along the entire annular upper edge of the leg section 33.

The foot section 40 is formed seamless of closely knit texture, preferably on a circular machine, with the transverse width of said foot section, seen particularly in Figure 3, being less than the transverse width of the instep portion of the open-mesh leg section, and including a completely enclosed toe portion 41, and the upwardly extending heel portion 42. The foot section 40 is united or affixed to the lower open end of the leg section 33, beginning with the off-set 36, by sewing the off-set edges 36 and the downwardly extending edges of the open-mesh blank, intermediate said off-set, (Figure 8) to the corresponding and complementary free edges of the seamless foot section 40, by a line of sewn stitches spaced inwardly a small distance from said edges, and transverse connecting threads extending across the free edges intermediate of the two sides of each stitch;—the free edge of the open-mesh blank being rolled into a bead to an extent sufficient to gather in a non-raveling loop along the entire edge of the foot or instep portion of the leg section.

The foregoing is illustrated particularly in section in Figure 10, as well as in Figures 1, 2 and 3. The line of stitches is designated by the numeral 43, while the transverse connecting threads, which gather in the open-mesh edges into a bead-like formation, are designated by the numeral 44.

Since the knit structure issuing from the needles of the knitting machine is extremely elastic, it is first sized by means of any suitable sizing, such as starch or any other water soluble sizing, and pressed flat. Thereupon the blank as shown particularly in Figure 8 is cut therefrom. After the hose has been fully assembled, as shown particularly in Figures 1, 2 and 3, the sizing is removed from the hose, so as to release its elastic qualities again, and the hose is then dyed to any desired color (the knit structure being made of undyed yarns). This preliminary sizing not only facilitates the cutting of the leg blank as shown in Figure 8, but also greatly facilitates the assembling of the hose and the union of the several parts thereof.

In Figure 5 we have illustrated another embodiment of our invention in leg structure of hose of this character, wherein the openings in the resultant structure are all of the same size. This knit structure is formed substantially the same as the structure shown in Figure 4, except that the alternate interknitting (in staggered relation) of the adjacent interknit threads is effected in the same uniform sequence each time.

Thus, the structure shown in Figure 5 also consists of the rows of non-interknit chain stitches 45 and the adjacent rows of interknit chain stitches 46 and 47.

In the forming of this structure, just as in the formation of the structure shown in Figure 4, the interknit rows of chain stitches 46 and 47 are oppositely disposed and are formed on the needles by two different and oppositely moving thread guide bars. Thus, for the structure shown in Figure 4, as well as the structure shown in Figure 5, three thread beams or at least three different sources of thread supply are required. One beam or source of supply supplies the threads 30 (Figure 4) or threads 45 (Figure 5) through a single thread guide bar (24) carrying a thread in operative relation to each needle. Two separate beams or sources of supply supply the interknit threads 31 and 32 (Figure 4) or 46 and 47 (Figure 5), through two separate guide bars (25 and 26):—the threads 31 (Figure 4) or threads 46 (Figure 5) from one beam and extending through one set of thread guides 28 alternating (in relation to successive needles) with the threads 32 (Figure 4)

or threads 47 (Figure 5) from the other beam which extend through the other thread guides 29. The needle bar 24 thus supplies a non-interknit thread (30 or 45) to each needle with each stroke of the needles for the formation of as many rows of non-interknit chains of chain stitches, while the bars 25 and 26 supply an interknit thread (31 or 46 and 32 or 47, respectively) to alternate needles for the formation of chain stitches with each stroke, but said guide bars 25 and 26 lap over (back and forth) two or more adjacent needles, between successive stitches, and in opposite directions so as to interknit the threads 31 or 46 delivered through one guide bar, and the threads 32 or 47 delivered through the other guide bar. This lapping over particular needles of the threads 31 and 32 or threads 46 and 47 in opposite directions may be effected for merely one stroke of the needles, (as for instance in the zone designated by the numeral 48) or may be effected for several strokes of the needles (as for instance in the zones indicated by the numerals 49 and 50), in order to get the varying sizes and shapes of openings 51, 52 and 53 (Figures 4 and 5).

It will be understood that the interknit stitches and the non-interknit stitches are formed on the same needles and during the same strokes, so that a unitary structure is obtained in which the non-interknit stitches are united to each other by the interknit stitches.

Figure 7:
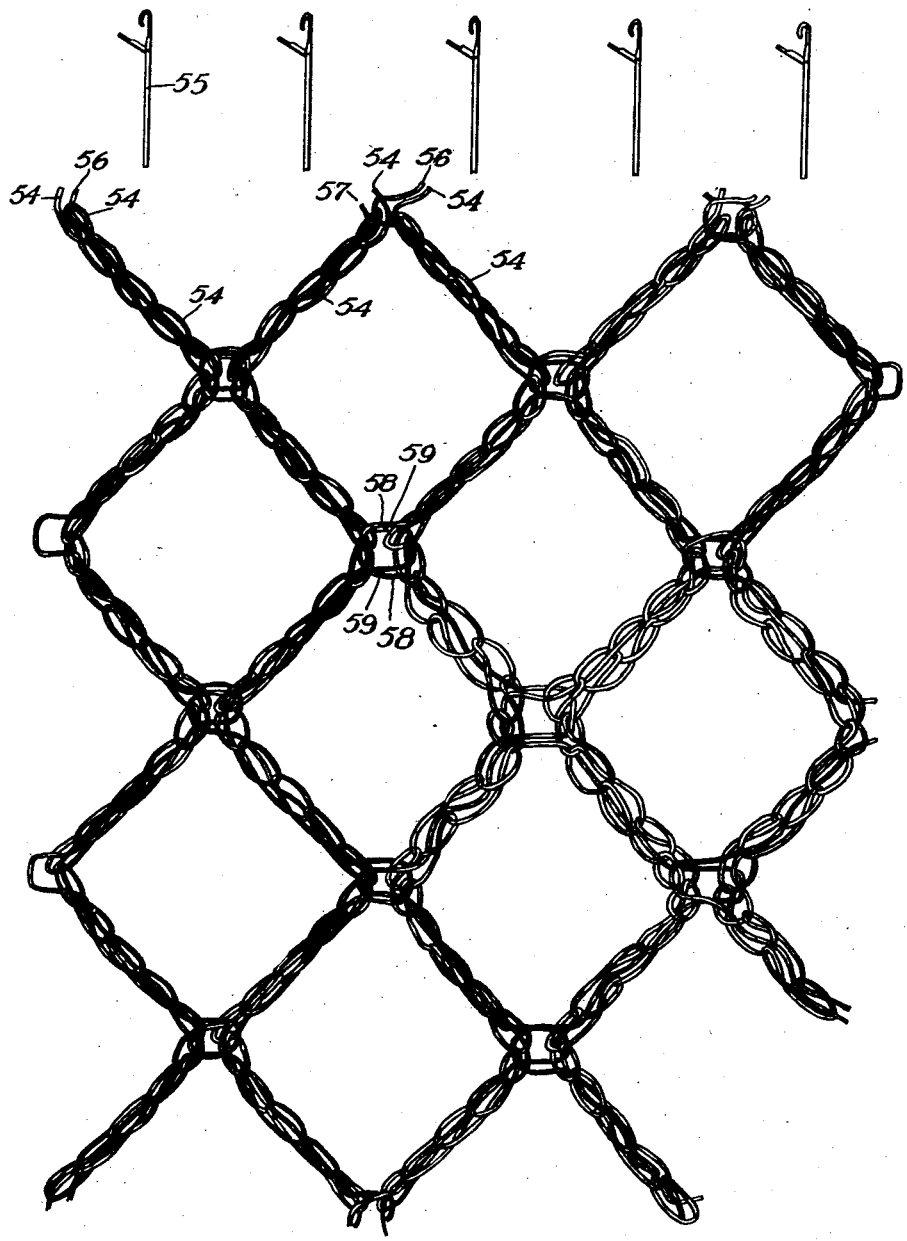
Figure 7 represents a plan view of a fragmentary portion of another modified form of body or leg section of hosiery embodying our invention.

In Figure 7 we have illustrated another embodiment of our invention, wherein the non-interknit rows of chain stitches 54, issuing from as many needles 55, are united to each other in alternate and staggered manner, by floating threads 56 and 57, one of which floats through alternate non-interknit chains of chain stitches 54 without being formed into any knit stitch, and which lap over from one chain to the other, between adjacent chains, as at 58 and 59, thereby uniting the non-interknit rows of chain stitches into a unitary and elastic and loosely knitted open mesh structure.

Figure 6:
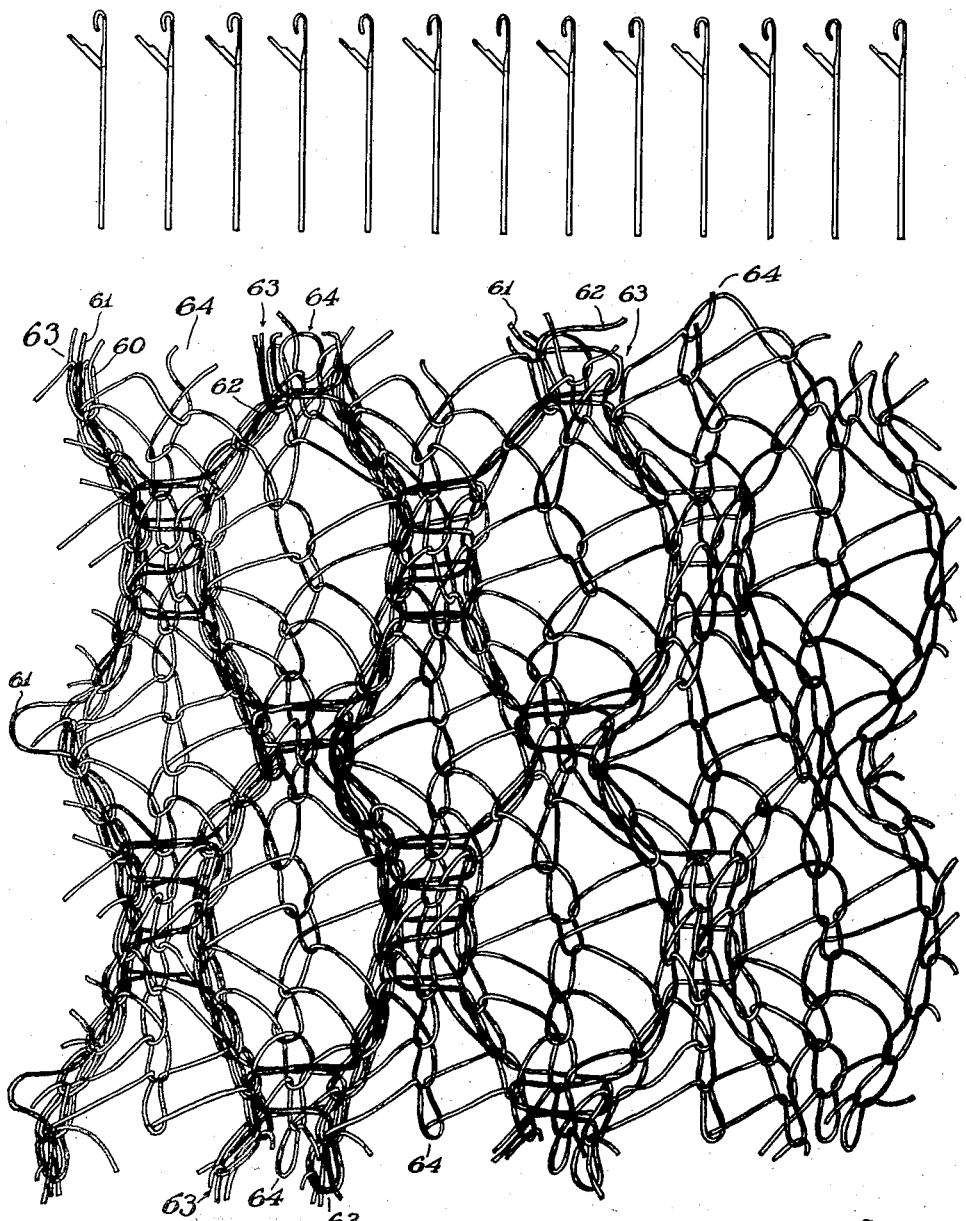
Figure 6 represents a plan view of a fragmentary portion of another modified form of body or leg section of hosiery embodying our invention.

In Figure 6 we have illustrated another embodiment of our knit structure for the leg of the hose, wherein the non-interknit rows of chain stitches 60, issued from as many adjacent needles, also have floating through them the connector threads 61 and 62 (disposed in alternate chains) similar to the floating connector threads 56 and 57 in the structure shown in Figure 7, but in addition thereto rows of interknit chain stitches 63 and 64 (similar to the interknit chain stitches of the structures shown in Figures 4 and 5) are also provided, but not for the primary purpose of tying the non-interknit rows of chain stitches to each other at intervals in alternate and staggered relation, but for the purpose of forming an interknit webbing extending through the openings created between the non-interknit rows of chain stitches.

Figure 11:
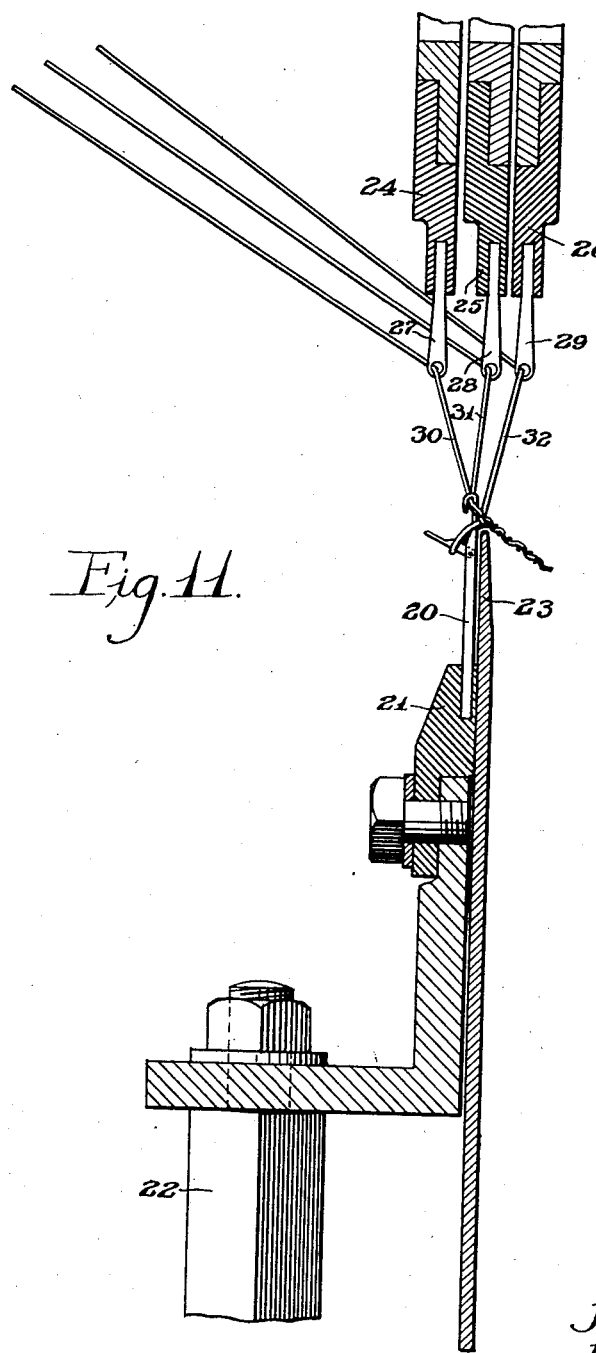
Figure 11 represents a fragmentary sectional view of a knitting machine in the act of forming our novel net-like mesh.

Thus, while the structures shown in Figures 4, 5 and 7 are made with three guide bars as shown diagrammatically in Figure 11, (and with as many different beams) the structure shown in Figure 6 is made with five guide bars, and as many beams. Thus one beam and a corresponding guide bar supply a thread to each needle or every alternate needle, as the case may be, for the formation of the non-interknit rows of chain stitches 60. Two other beams and corresponding guide bars supply, alternately, one floating connector thread (61 and 62) into alternate non-interknit rows of chain stitches. Two other beams and corresponding guide bars in turn supply threads 63 and 64 of which the intermediate webbing is formed by interknitting said threads with each other, by lapping over two needles between successive stitches. If desired, the non-interknit rows of chain stitches may be formed merely on every second needle, while the intermediate webbing formed of threads 63 and 64 may be knitted over every needle, including the alternate needles from which the non-interknit rows of chain stitches issue and the other set of alternate needles from which no non-interknit rows of chain stitches issue.

The particular size of the openings in any instance is governed by the lapping-over movements of the thread guide bars which carry the pairs of opposite interknit threads, as in the case of the structures of Figures 4 and 5, or which carry the pairs of opposite floating connector threads, as in the case of the structures of Figures 6 and 7. These movements are governed by the usual pattern chain which in turn may be varied according to the desired size of the openings.

It will thus be observed that by our novel method a hose is produced having a leg section of a highly elastic and loosely knitted, net-like open-mesh structure, which, unlike the "glove silk" type materials, has but a minimum "coverage" and is capable of a much higher degree of elasticity. By our novel method also, a more suitable and more desirable product is produced.

We are aware that our invention may be embodied in other specific forms without departing from the spirit or essential attributes thereof, and we therefore desire the present embodiments to be considered in all respects as illustrative and not restrictive, reference being had to the appended claims rather than to the foregoing description to indicate the scope of the invention.

Having thus described our invention, what we hereby claim as new and desire to secure by Letters Patent, is:—

1. The method of making hosiery which consists in forming the leg section of the hose in a flat condition by loosely knitting over a single set of knitting needles in straight alignment with each other and operating in unison with each other, longitudinal rows of non-inter-knit chain stitches, as well as longitudinal rows of inter-knit chain stitches;—each row of inter-knit chain stitches being inter-knit, alternately, with the two similar adjacent rows on either side thereof at suitable intervals and in a staggered order, and said non-inter-knit rows of chain stitches being interlaced with said inter-knit rows of chain stitches to bind the latter, thereby forming a highly elastic, net-like, open-mesh structure of loose chain stitches; sizing the resultant knit structure and setting it in a flat condition, cutting from said flat, sized, knit structure a leg section of a stocking including the instep portion of the foot of the stocking, uniting the longitudinal edges of said leg section to each other, and uniting to the upper end of said leg section a closely knit top section having a single ply where union is made with the leg section, and uniting with the lower free edges of the leg section a closely knit and seamless sole section, and removing the sizing from the leg section.

2. The method of making hosiery which consists in forming the leg section of the hose in a flat condition by loosely knitting over a single set of knitting needles in straight alignment with each other and operating in unison with each other, longitudinal rows of non-inter-knit chain stitches, as well as longitudinal rows of inter-knit chain stitches;—each row of inter-knit chain stitches being inter-knit, alternately, with the two similar adjacent rows on either side thereof at suitable intervals and in a staggered order, and said non-inter-knit rows of chain stitches being interlaced with said inter-knit rows of chain stitches to bind the latter, thereby forming a highly elastic, net-like, open-mesh structure of loose chain stitches; cutting from the resultant flat knit structure a leg section of a stocking including the instep portion of the foot of the stocking, uniting the longitudinal edges of said leg section to each other by a line of sewn stitches spaced inwardly a slight distance from the free edges and transverse connecting threads extending across the free edges, intermediate the two sides of each stitch;—the free edges being formed into a bead to an extent sufficient to gather in a non-raveling loop of the knit structure along the entire length of the united edges, uniting to the upper end of said leg section a closely knit top section having an upper double ply portion and a lower single ply portion, by a line of sewn stitches spaced inwardly a slight distance from the free edges and transverse connecting threads extending across the free edges intermediate the two sides of each stitch;—the free edges being formed into a bead to an extent sufficient to gather in a non-raveling loop of the leg section along the entire upper edge thereof, and uniting with the lower free edges of the leg and instep section, a closely knit foot section including a seamless sole, by a line of sewn stitches spaced inwardly a slight distance from the free edges, and transverse connecting threads extending across the free edges intermediate the two sides of each stitch;—the free edge of the leg section and instep section being formed into a bead to an extent sufficient to gather in a non-raveling loop along the entire edge of said leg and instep section.

3. The method of making hosiery which consists in forming the leg section of the hose in a flat condition by loosely knitting over a single set of knitting needles in straight alignment with each other and operating in unison with each other, longitudinal rows of non-inter-knit chain stitches, as well as longitudinal rows of inter-knit chain stitches;—each row of inter-knit chain stitches being inter-knit, alternately, with the two similar adjacent rows on either side thereof at suitable intervals and in a staggered order, and said non-inter-knit rows of chain stitches being interlaced with said inter-knit rows of chain stitches to bind the former, thereby forming a highly elastic, net-like, open-mesh structure of loose chain stitches; cutting from the resultant flat knit structure a leg section of a stocking including the instep portion of the foot of the stocking, uniting the longitudinal edges of said leg section to each other by a longitudinal line of sewn stitches spaced inwardly a slight distance from the free edges and transverse connecting threads extending across the free edges, intermediate the two sides of said longitudinal stitches;—the free edges being formed into a bead to an extent sufficient to gather in a non-raveling loop of the knit structure along the entire length of the united edges, uniting to the upper end of said leg section a closely knit top section having a double ply portion, by a longitudinal line of sewn stitches spaced inwardly a slight distance from the free edges and transverse connecting threads extending across the free edges intermediate the two sides of said longitudinal stitches;—the free edges being formd into a bead to an extent sufficient to gather in a non-raveling loop of the leg section along the entire upper edge thereof, and uniting with the lower free edges of the leg and instep section, a closely knit foot section by a longitudinal line of sewn stitches spaced inwardly a slight distance from the free edges, and transverse connecting threads extending across the free edges intermediate the two sides of said longitudinal stitches;—the free edge of the leg section and instep section being formed into a bead to an extent sufficient to gather in a non-raveling loop along the entire edge of said leg and instep section.

4. The method of making hosiery which consists in forming the leg section of the hose in a flat condition by knitting over a set of needles in straight alignment with each other and operating in unison with each other, longitudinal rows of non-inter-knit chain stitches at uniformly spaced intervals, and providing an additional thread interlaced with each longitudinal row of chain stitches;—each of said additional threads being interlaced at suitable intervals, alternately, with the two generally adjacent similar longitudinal rows of non-inter-knit chain stitches, in a staggered order, thereby to tie said non-inter-knit rows of chain stitches to each other at intervals and in staggered relation between the generally adjacent rows on either side of each row, so as to form a highly elastic net-like open-mesh structure of loose chain stitches; cutting from said flat knit structure a leg section of a stocking including the instep portion of the foot of the stocking; uniting the longitudinal edges of said leg section to each other by a line of sewn stitches spaced inwardly a slight distance from the free edges and transverse connecting threads extending across the free edges, intermediate the two sides of the longitudinal stitches;—the free edges being formed into a bead to an extent sufficient to gather in a non-ravelling loop of knit structure along the entire length of the united edges, and uniting to the upper end of said leg section, a closely knit top section and uniting with the lower free edges of said leg section a closely knit sole section.

5. The method of making hosiery which consists in forming the leg section of the hose in a flat condition by loosely knitting over a set of needles in straight alignment with each other and operating in unison with each other, longitudinal rows of non-interknit chain stitches at uniformly spaced intervals, and providing a floating connector thread in each row of chain stitches;—said floating connector threads extending across from one chain to the adjacent chain at intervals and in alternate and staggered relation, thereby to tie said non-interknit rows of chain stitches to each other at intervals and in alternate and staggered relation, so as to form a highly elastic net-like open-mesh structure of chain stitches; cutting from said flat knit structure a leg section of a stocking including the instep portion of the foot of the stocking, uniting the longitudinal edges of said leg section to each other by a line of sewn stitches spaced inwardly a slight distance from the free edges and transverse connecting threads extending across the free edges, intermediate the two sides of the longitudinal stitches;—the free edges being formed into a bead to an extent sufficient to gather in a non-ravelling loop of knit structure along the entire length of the united edges, and uniting to the upper end of said leg section a closely knit top section, and uniting with the lower free edges of said leg section a closely knit sole section.

6. A stocking comprising a highly elastic net-like open-mesh leg section made of flat knitted material comprising non-interknit rows of loose chain stitches and threads interlaced with said non-inter-knit rows of chain stitches and inter-connecting adjacent non-interknit rows of chain stitches in alternate and staggered relation at suitable intervals, and being formed into tubular formation by a line of sewn stitches spaced inwardly a slight distance from the free longitudinal edges of the knit material, and transverse connecting threads extending across said free edges intermediate the longitudinal stitches;—the free edges being formed into a bead to an extent sufficient to gather in a non-raveling loop of the loose-knit structure along the entire length of the united edges, and closely knit top and sole sections united to the leg section by corresponding lines of sewn stitches spaced inwardly a slight distance from the free edges and transverse connecting threads extending across the free edges intermediate the two sides of each stitch;—the free edges being formed into a slight bead.

7. The method of making hosiery which consists in forming the leg section of the hose in a flat condition by loosely knitting over a single set of knitting needles in straight alignment with each other and operating in unison with each other, longitudinal rows of non-inter-knit chain stitches, as well as longitudinal rows of inter-knit chain stitches;—each row of inter-knit chain stitches being inter-knit, alternately, with the two similar adjacent rows on either side thereof at suitable intervals and in a staggered order, and said non-inter-knit rows of chain stitches being interlaced with said inter-knit rows of chain stitches to bind the latter, thereby forming a highly elastic, net-like, open-mesh structure of loose chain stitches; sizing the resultant knit structure and setting it in a flat condition, cutting from said flat, sized, knit structure a leg section of a stocking including the instep portion of the foot of the stocking, uniting the longitudinal edges of said leg section to each other, and uniting to the upper end of said leg section a closely knit top section, and uniting with the lower free edges of the leg section a closely knit sole section, and removing the sizing from the leg section.

8. The method of making hosiery which consists in forming the leg section of the hose in a flat condition by loosely knitting over a single set of knitting needles in straight alignment with each other and operating in unison with each other, longitudinal rows of non-inter-knit chain stitches, as well as longitudinal rows of inter-knit chain stitches;—each row of inter-knit chain stitches being inter-knit, alternately, with the two similar adjacent rows on either side thereof at suitable intervals and in a staggered order, and said non-inter-knit rows of chain stitches being interlaced with said inter-knit rows of chain stitches to bind the latter, thereby forming a highly elastic, net-like, open-mesh structure of loose chain stitches; cutting from the resultant flat knit structure a leg section of a stocking including the instep portion of the foot of the stocking, uniting the longitudinal edges of said leg section to each other by a line of sewn stitches spaced inwardly a slight distance from the free edges, and transverse connecting threads extending across the free edges, intermediate the two sides of each stitch;—the free edges being formed into a bead to an extent sufficient to gather in a non-raveling loop of the knit structure along the entire length of the united edges, uniting to the upper end of said leg section a closely knit top section, by a line of sewn stitches spaced inwardly a slight distance from the free edges and transverse connecting threads extending across the free edges intermediate the two sides of each stitch;— the free edges being formed into a bead to an extent sufficient to gather in a non-raveling loop of the leg section along the entire upper edge thereof, and uniting with the lower free edges of the leg and instep section, a closely knit foot section including a sole, by a line of sewn stitches spaced inwardly a slight distance from the free edges, and transverse connecting threads extending across the free edges intermediate the two sides of each stitch;—the free edge of the leg section and instep section being formed into a bead to an extent sufficient to gather in a non-raveling loop along the entire edge of said leg and instep section.

9. The method of making hosiery which consists in forming the leg section of the hose in a flat condition by loosely knitting over a set of knitting needles in straight alignment with each other and operating in unison with each other, longitudinal rows of chain stitches; each row of loose chain stitches being inter-connected alternately and in staggered order with similar adjacent rows of chain stitches, thereby to form a highly elastic, net-like, open-mesh structure of loose chain stitches, sizing the resultant knit structure and setting it in a flat condition, cutting from said flat, sized, knit structure, a leg section of a stocking including the instep portion of the foot of the stocking, uniting the longitudinal edges of said leg section to each other, and uniting to the upper end of said leg section, a closely knit top section, and uniting with the lower free edges of the leg section a closely knit sole section, and removing the sizing from the leg section.

10. The method of making hosiery which consists in forming the leg section of the hose in a flat condition by loosely knitting over a set of knitting needles in straight alignment with each other and operating in unison with each other, longitudinal rows of chain stitches; each row of loose chain stitches being inter-connected alternately and in staggered order with similar adjacent rows of chain stitches, thereby to form a highly elastic, net-like, open-mesh structure of loose chain stitches, sizing the resultant knit structure and setting it in a flat condition, cutting from said flat, sized, knit structure, a leg section of a stocking including the instep portion of the foot of the stocking, uniting the longitudinal edges of said leg section to each other, by external threads sewn thereover, spaced inwardly a slight distance from the free edges and extending transversely across the free edges, thereby to form said free edges into a bead to an extent sufficient to gather in a non-raveling loop of the knit structure along the entire length of the united edges, and uniting to the upper end of said leg section, a closely knit top section, and uniting with the lower free edges of the leg section a closely knit sole section, and removing the sizing from the leg section.

11. The method of making hosiery which consists in forming the leg section of the hose in a flat condition, by loosely knitting over a set of knitting needles in straight alignment with each other and operating in unison with each other, longitudinal rows of chain stitches; each row of loose chain stitches being inter-connected longitudinally and in staggered order with similar adjacent rows of chain stitches, thereby to form a highly elastic, net-like, open-mesh structure of loose chain stitches, cutting from the resultant flat knit structure a leg section of a stocking including the instep portion of the foot of the stocking, uniting the longitudinal edges of said leg section to each other by a line of sewn stitches spaced inwardly a slight distance from the free edges, and connecting threads extending transversely across the free edges intermediate the two sides of said longitudinal stitches;—the free edges being formed into a bead to an extent sufficient to gather in a non-raveling loop of the knit structure along the entire length of the united edges, uniting to the upper end of said leg section a closely knit top section, by a line of sewn stitches spaced inwardly a slight distance from the free edges and connecting threads extending transversely across the free edges intermediate the two sides of said longitudinal stitches;—the free edges being formed into a bead to an extent sufficient to gather in a non-raveling loop of the leg section along the entire upper edge thereof, and uniting with the lower free edges of the leg and instep section a closely knit foot section including a sole, by a line of sewn stitches spaced inwardly a slight distance from the free edges, and connecting threads extending transversely across the free edges intermediate the two sides of said first named stitches, the free edge of the said leg section and instep section being formed into a bead to an extent sufficient to gather in a non-raveling loop along the united edges of the leg and instep section.

In testimony whereof we have hereunto set our hands and seals.

JOHN C. DECKER.
HARRY AULL.